US012594869B2

(12) United States Patent
O'Brien

(10) Patent No.: US 12,594,869 B2
(45) Date of Patent: Apr. 7, 2026

(54) RAMP ASSEMBLY

(71) Applicant: Gene O'Brien, Tonka Bay, MN (US)

(72) Inventor: Gene O'Brien, Tonka Bay, MN (US)

( * ) Notice: Subject to any disclaimer, the term of this patent is extended or adjusted under 35 U.S.C. 154(b) by 0 days.

(21) Appl. No.: 18/444,008

(22) Filed: Feb. 16, 2024

(65) Prior Publication Data

US 2024/0190326 A1 Jun. 13, 2024

Related U.S. Application Data

(63) Continuation of application No. 17/395,202, filed on Aug. 5, 2021, now Pat. No. 11,932,157.

(60) Provisional application No. 63/061,687, filed on Aug. 5, 2020.

(51) Int. Cl.
*B60P 1/43* (2006.01)
*B65G 67/24* (2006.01)

(52) U.S. Cl.
CPC ................ *B60P 1/43* (2013.01); *B65G 67/24* (2013.01)

(58) Field of Classification Search
CPC .................................. B65G 67/24; B60P 1/43
See application file for complete search history.

(56) References Cited

U.S. PATENT DOCUMENTS 5,022,697 A * 6/1991 Hettwer .................. B60P 1/431
280/783
2017/0022017 A1 * 1/2017 Lopez .................... B65G 69/30

* cited by examiner

*Primary Examiner* — Ernesto A Suarez

(57) ABSTRACT

A ramp assembly for unloading goods from an elevated platform that includes a platform and a ramp that can be rotated or orbited around a perimeter of a platform without rotating the platform. The ramp assembly uses an orbiting assembly that includes a rail and a rider in order to permit easy placement of a lower end of a ramp relative to the platform.

19 Claims, 18 Drawing Sheets

RAMP ASSEMBLY

RELATED APPLICATIONS

This application is a continuation of U.S. application Ser. No. 17/395,202 filed Aug. 5, 2021, entitled Ramp Assembly, which claims priority to U.S. Provisional Application Ser. No. 63/061,687 filed Aug. 5, 2020, entitled Loading Ramp With Pivoting Platform, all of which are incorporated by reference in their entireties.

BACKGROUND OF THE INVENTION

Typical transport vehicles, such as semi-truck trailers and other delivery vehicles, train cars, and the like, have enclosed platforms or beds on which transported goods are held. The platforms are elevated to allow for the large wheels necessary for transporting heavy loads. In many instances, the goods are onloaded and offloaded at loading docks, which are level with the beds such that the goods are easily transferred on and off the vehicle. However, in certain instances, the delivery is made to a location that does not have a loading dock.

Using beverage service trucks as a non-limiting example, these trucks make multiple stops to various venues that sell or serve beverages. Most small venues do not receive enough goods, or have enough real estate, to have a loading dock. The delivery person must use an elevator or a ramp and a hand truck to lower the goods from the truck bed to a ground level. Moving trucks are another non-limiting example where goods are manually lowered from the truck bed to a ground level.

Standard ramp systems used for this purpose or stored, either on the truck bed or under the truck bed and are manually pulled out of storage and attached to the truck such that the top of the ramp is in line with the door. When unloading from a side-door of the truck, which is often necessary to access goods other than those at the back of the truck, the ramp, when attached to the truck, extends perpendicularly to the truck. The truck driver must take care to position the truck such that the ramp may extend perpendicularly from the location of the door to the ground without obstruction. This may be difficult due to trees, curvature of the road, uneven ground, curbs, etc.

One effort to remedy this problem included a ramp that is pivotally attached to the truck such that the operator has more options as to how the ramp extends from the truck. This ramp is described in U.S. Pat. Nos. 9,694,997 and 10,807,814, both to Lopez and both entitled DELIVERY RAMP WITH AN ADJUSTABLE ROTATABLE PIVOT. Although the described ramp provides flexibility by providing a pivot feature, the embodiments of these prior art designs appear to have lengthy setup times. For example, the described embodiments of the Lopez references involve stabilization legs that must be extended to a supporting ground surface. Additionally, the assembly is attached to a truck with a lip system that would be best optimized with a level support surface, which may not be available. The system further requires disassembly and storage when delivery is complete. All these steps may decrease the time saved using a pivoting ramp. Additionally, the pivot mechanisms are designed such that they support the weight of the load and the delivery person during operation. This would likely lead to accelerated wear and tear.

There is thus a need for a ramp assembly that both provides allows a ramp angle from the truck to be selected and is easily deployed and stowed. There is further a need for a ramp assembly that utilizes a low-friction, low-maintenance orbiting mechanism that is also robust enough for prolonged use.

OBJECTS AND SUMMARY OF THE INVENTION

The invention described herein addresses the aforementioned needs by providing an orbiting ramp assembly that is securely fastened to a truck and easily deployed. The term "orbit" is defined herein as "a first component connected to a circular perimeter of a second component such that the first component is able to translate in a circular path partially around the second component." The term "orbit," as used herein, is thus being used as a distinction to the term "pivot," which connotes a connection between a first component and a second component such that the first component is able to rotate about an axis that is defined by the connection point. No other definition is to be assigned to the term "orbit" in this application. Nor it the term "orbit" to be interpreted as the first component being able to translate completely around the second component.

One aspect of the invention is an improved ramp assembly that includes a reinforced platform that can slide or rotate out from beneath a truck but is otherwise fixed to the truck, thereby obviation the need for supports that extend to the ground.

One aspect of the invention is an improved ramp assembly designed to allow a single operator to pull a ramp out from under a truck and place the ramp down within at least a 180-degree arc and use it to offload products from the truck using a hand truck.

Another aspect of the invention is an improved ramp assembly that can be stored quickly by lifting a distal end of the ramp, rotating it to a retaining mechanism under the truck, stowing the distal end in the retaining mechanism, and pushing a trolley at a proximal end of the assembly under the truck.

Yet another aspect of the invention is an improved orbiting ramp assembly that uses at least one or two rows of vertical bearing wheels to allow low friction orbiting of the ramp.

Still another aspect of the invention is an improved orbiting ramp assembly that uses at least one or two rows of horizontal bearing wheels to allow low friction orbiting of the ramp.

Still another aspect of the invention is an improved orbiting ramp assembly is a polymeric slide assembly that uses vertical sliding surfaces to allow low friction orbiting of the ramp.

One aspect of the invention provides an orbiting ramp assembly comprising: a platform having a circular portion with a perimeter and including a stage and a stage frame supporting the stage; a ramp; a trolley including a transition plate having a circular edge that complements the circular portion of the platform and a straight edge configured to receive the ramp; the trolley further including a slider connecting the transition plate and the platform, the platform including a rail in which the rider is engaged such that the trolley can slide relative to the rail; wherein one of the rail and the rider is attached to the platform and aligns with the circular edge of the platform and the other of the rail and the rider is attached to the transition plate and aligns with the circular edge of the transition plate.

The ramp may include an attachment feature allowing the ramp to be quickly attached and detached to and from the orbit assembly. The ramp may be fixed to the orbit assembly with a connector that allows the ramp to have at least a limited range of vertical rotation relative to the orbit assembly. The rail and rider may be a vertically oriented sliding assembly. Alternatively, the rail may be a B-rail.

The rail or the rider may include a plurality of wheel assemblies. The rail and rider allow the platform to remain stationary when the ramp is moved.

In at least one embodiment, the rider comprises wheels that are locked into the rail and allowed to rotate within the rail. The wheels may be horizontally oriented wheels, vertically oriented wheels, or the wheels may be obliquely angled.

Another aspect of the invention is an orbit assembly that connects a ramp to an elevated platform and allows a loading ramp to be positioned at a selectable angle relative to the elevated platform comprising: a semi-circular rail and a semi-circular rider engaged with the rail such that the rider is able to translate along the semicircular rail; wherein one of the rail and the rider is attachable to an elevated platform and the other of the rail and the rider is part of a trolley; and wherein when a ramp is attached to the trolley, the orbit assembly allows the ramp to be orbited around the elevated platform.

The orbit assembly may include a rail and rider that comprise a vertically oriented sliding assembly. Alternatively, the rail may be a B-rail.

In at least one embodiment one of the rail and the rider includes a plurality of wheel assemblies.

In at least one embodiment platform remains stationary when the ramp is moved.

Yet another aspect of the invention is a method of unloading goods from a truck comprising: providing a platform having a semi-circular edge; connecting a ramp to the platform such that the ramp is able to rotate around the semi-circular edge without rotating the platform; lifting a lower end of the ramp and rotating the ramp around the semi-circular edge; and placing the lower end of the ramp is placed on a desired surface.

In at least one embodiment, connecting the ramp to the platform comprises connecting the ramp to a trolley that is connected to the semi-circular edge of the platform such that the trolley is able to slide around the semi-circular edge.

The trolley may be connected to the semi-circular edge with a rail and a rider that rides in the rail.

In at least one embodiment connecting the ramp to the platform comprises connecting the ramp to a trolley that is engaged with the semi-circular edge of the platform.

In at least one embodiment the rail is attached to the platform and the rider is attached to the trolley.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
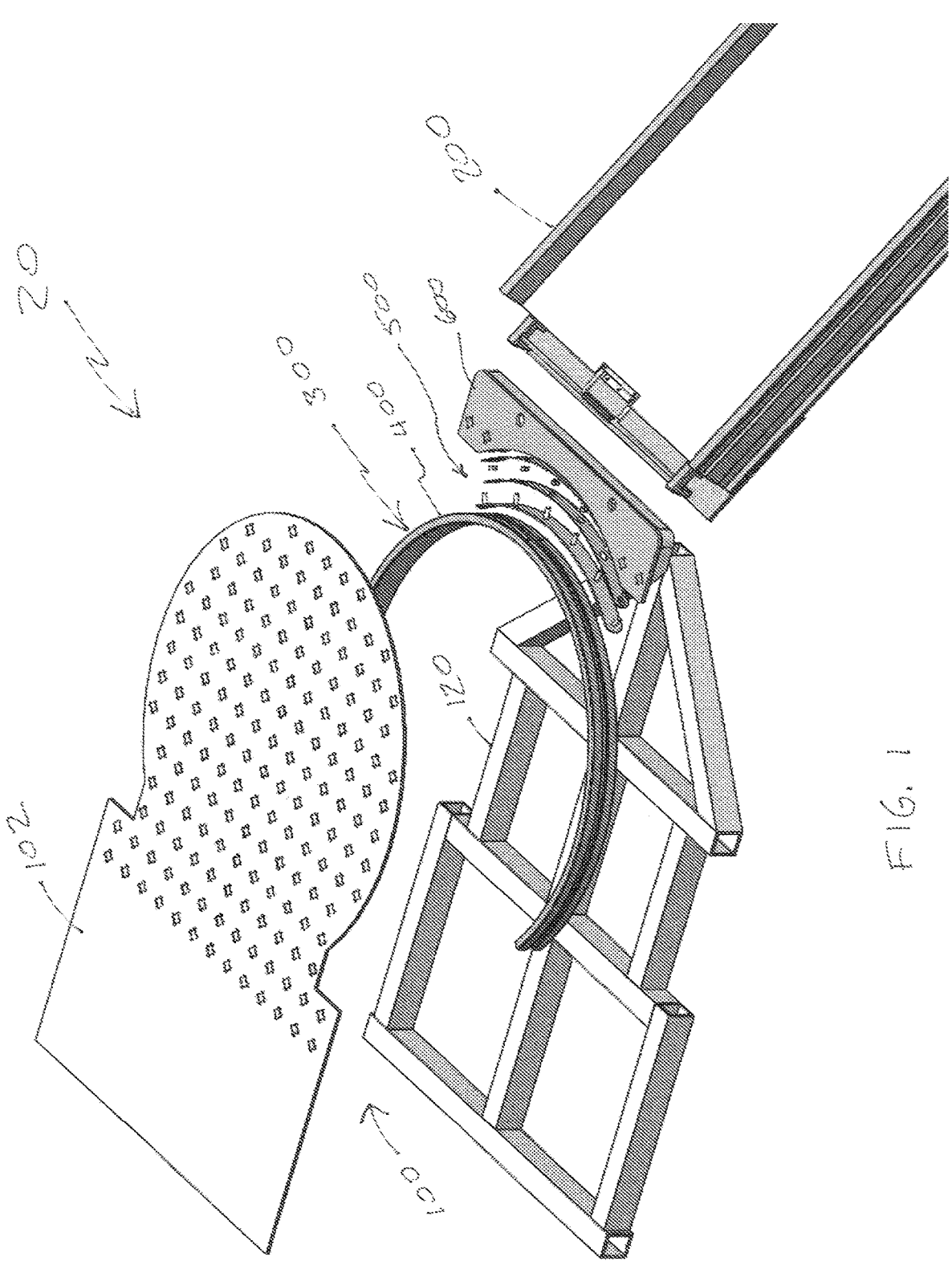
FIG. 1 is a is a perspective exploded view of an embodiment of the invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Referring now to the figures and first to FIG. 1 there is shown an exploded view of an embodiment of a ramp assembly 20 of the present invention. This view is used to show the basic components of the various embodiments described herein. Unless otherwise noted, it will be understood that any of the embodiments of the various components may be used with any combination of the other embodiments of the various components to create an assembly that falls under the scope of the invention.

FIG. 1 shows that the various ramp assemblies 20 of the invention generally include a platform 100 including a stage 102 and a stage frame 120, a ramp 200, and an orbit assembly 300 that generally includes a rail 400 and a trolley 500. The ramp assembly 20 may be connected to the truck with a drawer assembly 800 (FIG. X).

Figure 2:
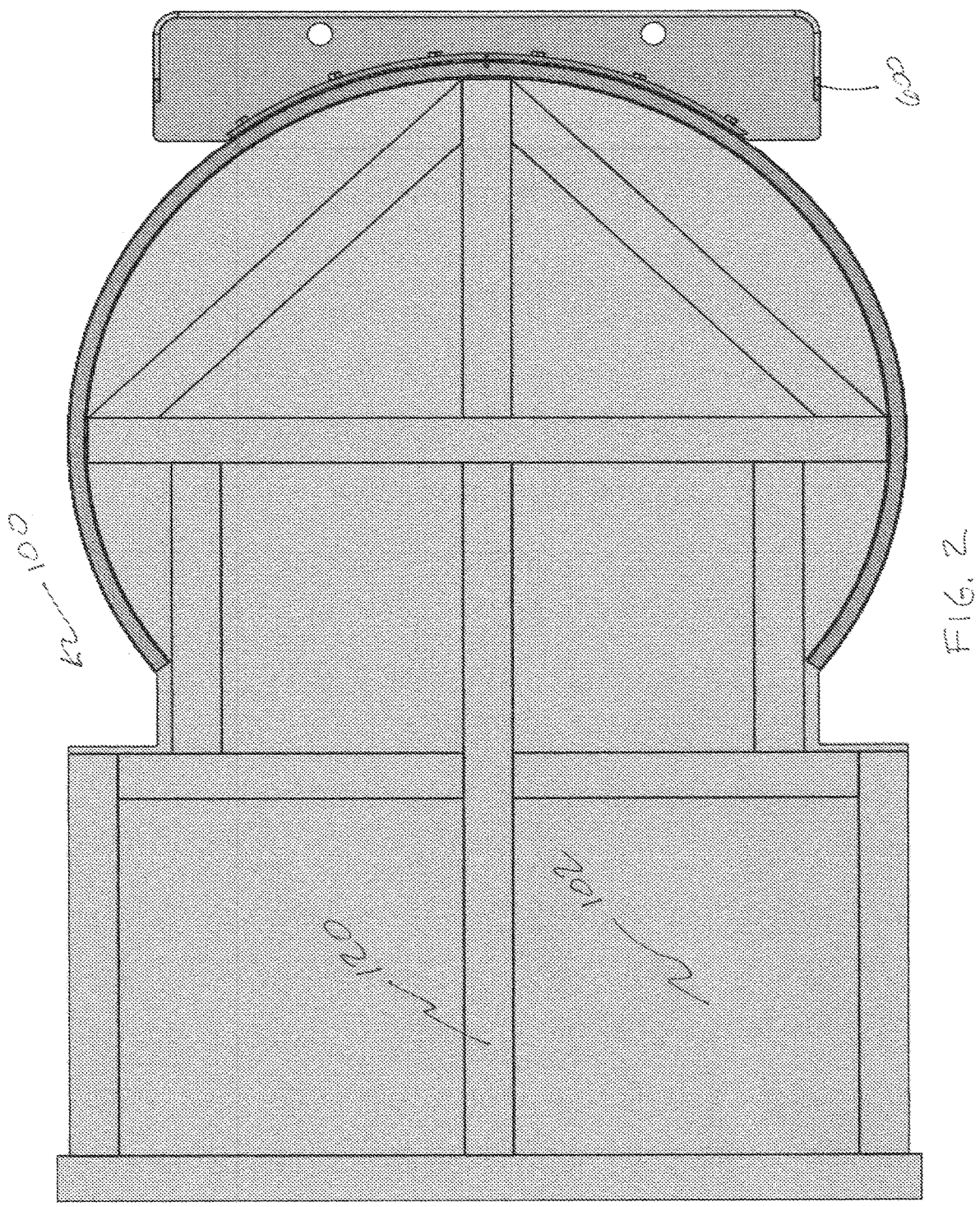
FIG. 2 is a bottom view of an embodiment of a platform of the invention.
Figure 3:
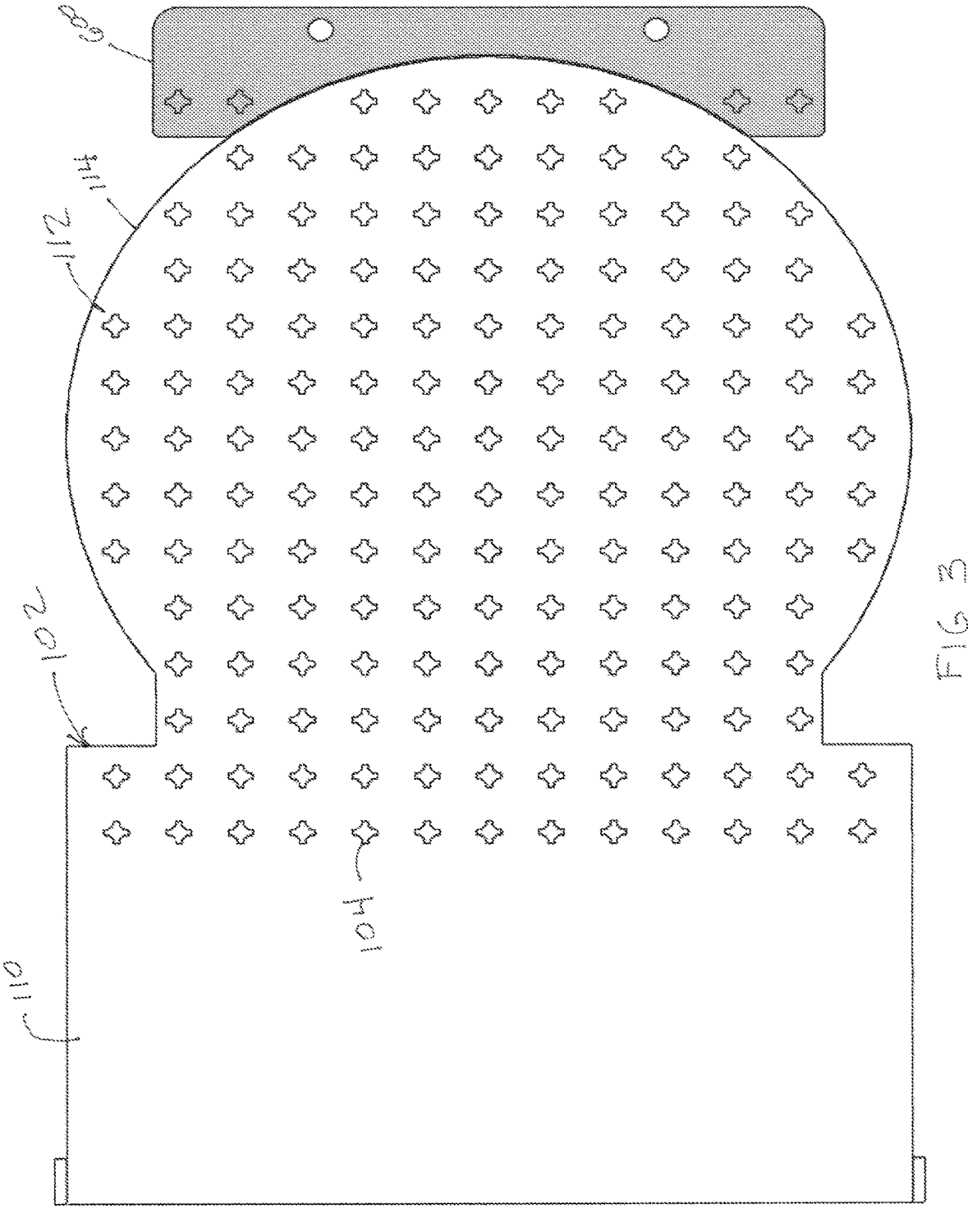
FIG. 3 is a top view of an embodiment of a stage of the platform of the invention.
Figure 4:
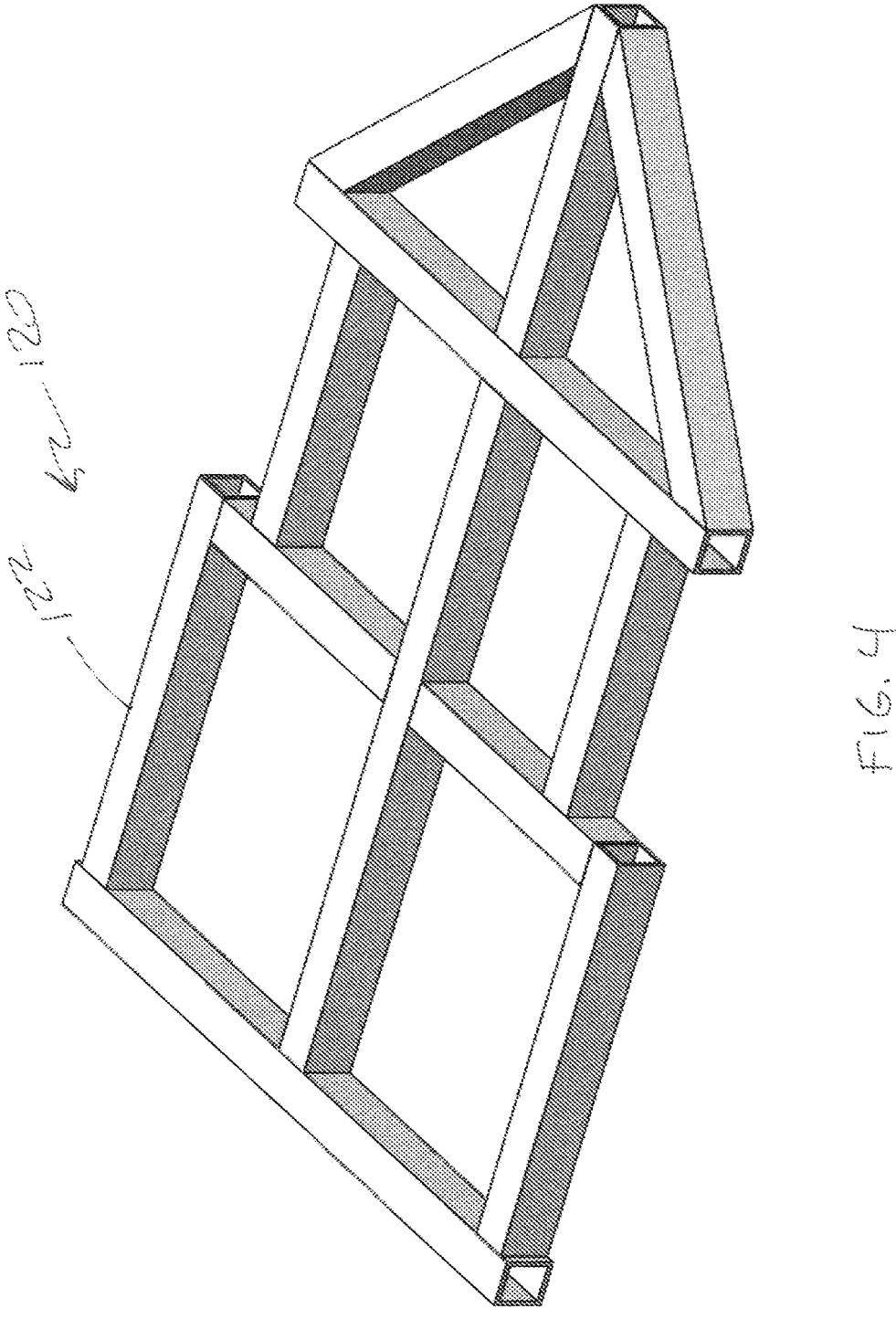
FIG. 4 is a perspective view of an embodiment of a stage frame of the platform of the invention.

FIGS. 2-4 show the platform 100. FIG. 2 is a bottom view of the platform 100 showing the relationship between the stage frame 120 and the stage 102. The stage 102 is generally fixed to an upper surface of the stage frame 120, which provides strength and stability to the platform 100.

An embodiment of the stage 102 is shown in FIG. 3. In at least one embodiment, the stage is generally planar and formed from a single sheet of material. Though most rigid materials could be used, a form of steel or aluminum is preferred, such as galvanized or stainless steel. Other alternatives include textured plastic or other polymers, carbon fiber, hardwood, etc. One skilled in the art will realize the thickness of the stage 102 will depend largely on the material selected. For example, aluminum is light, strong and generally corrosion-resistant and would thus make an excellent material choice, but to prevent denting, a thicker piece should be used than if an alternative material, such as galvanized steel, is selected.

As shown in the figures, because the stage 102 is a walking surface, it may be textured in order to provide better grip and prevent slipping. Raised bumps 104 are shown in the figures but other textured surfaces may be provided including, but not limited to, etched grooves, corrugations, non-skid strips, etc.

The stage 102 is optimally cut or otherwise formed to the shape shown in FIG. 3. The shape includes a rectangular portion 110 and a circular portion 112. The rectangular portion 102 serves as a smooth transition between the truck bed and the stage. The circular portion 112 has a circular perimeter 114 to which the rail 400 is attached, formed or otherwise joined.

Using the perimeter of the circular portion 112 as the dynamic connection between the ramp 200 and the stage 102 has several advantages over a pivot point that is centered in the circular portion 112. For example, a central pivot point necessarily supports any load that passes over the stage, almost always including the weight of the delivery person in addition to the weight of the load. This places stress on the connection point, typically a pivot plate or disc, that may cause premature wear over time. This is especially true once gritty contaminants inevitably infiltrate the space between the discs that slide against each other. Additionally, these discs typically have a large sliding surface area between the stationary plate and the rotating plate. This large sliding surface area results in significant friction, making rotating the stage unnecessarily difficult. Furthermore, the rotating plate design requires either that the top plate rotates when the ramp is moved, or that a bottom plate rotates when the ramp is moved.

If the top plate rotates when the ramp is moved, there must be a connecting groove between the top rotating plate and the part of the platform that attaches to the truck. This exposed groove would provide a collection point for dirt and debris to collect, degrading the operation of the pivoting mechanism.

If the top plate is stationary relative to the truck, and the bottom plate rotates relative to the truck, then the bottom plate must support the weight of the ramp. Because the bottom plate and the top plate are connected by the pivot point, the pivot point bears a significant load during operation. This necessitates the use of cumbersome and time-consuming support mechanisms that extend to the ground to alleviate the load otherwise born by the pivot mechanism.

As will be explained in more detail below, using a perimeter-mounted orbit system allows minimal contact and even, in the case of plastic slide plates, the use of vertically oriented slide surfaces. It is noted this discussion of perimeter-mounted orbit systems is provided to explain the shape of the circular portion 112 of the stage 102. The perimeter-mounted orbit system may be attached to the stage 102 or the frame 120 or both.

FIG. 4 shows an embodiment of the frame 120. The frame 120, in this embodiment, is a series of interconnected beams 122 connected to form a supporting framework that adds rigidity and support for the stage 102. The number, size and orientation of the interconnected beams is a design consideration that should consider the material and thickness selected for the stage 102. For example, if a thinner sheet of material is selected for the stage 102, more beams 122 may be desired for the frame 120.

Figure 5:
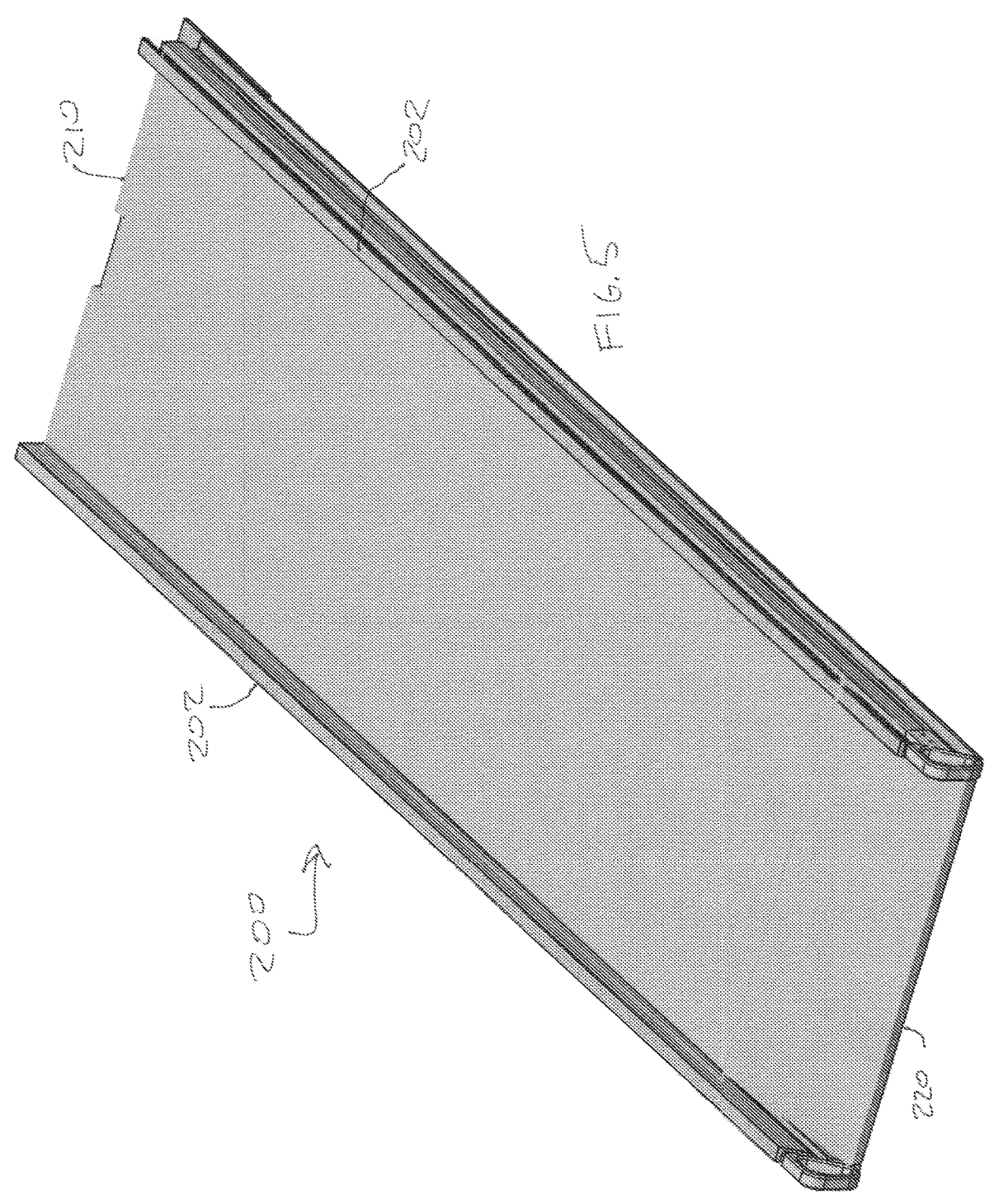
FIG. 5 is a perspective view of an embodiment of a ramp of the invention.
Figure 6:
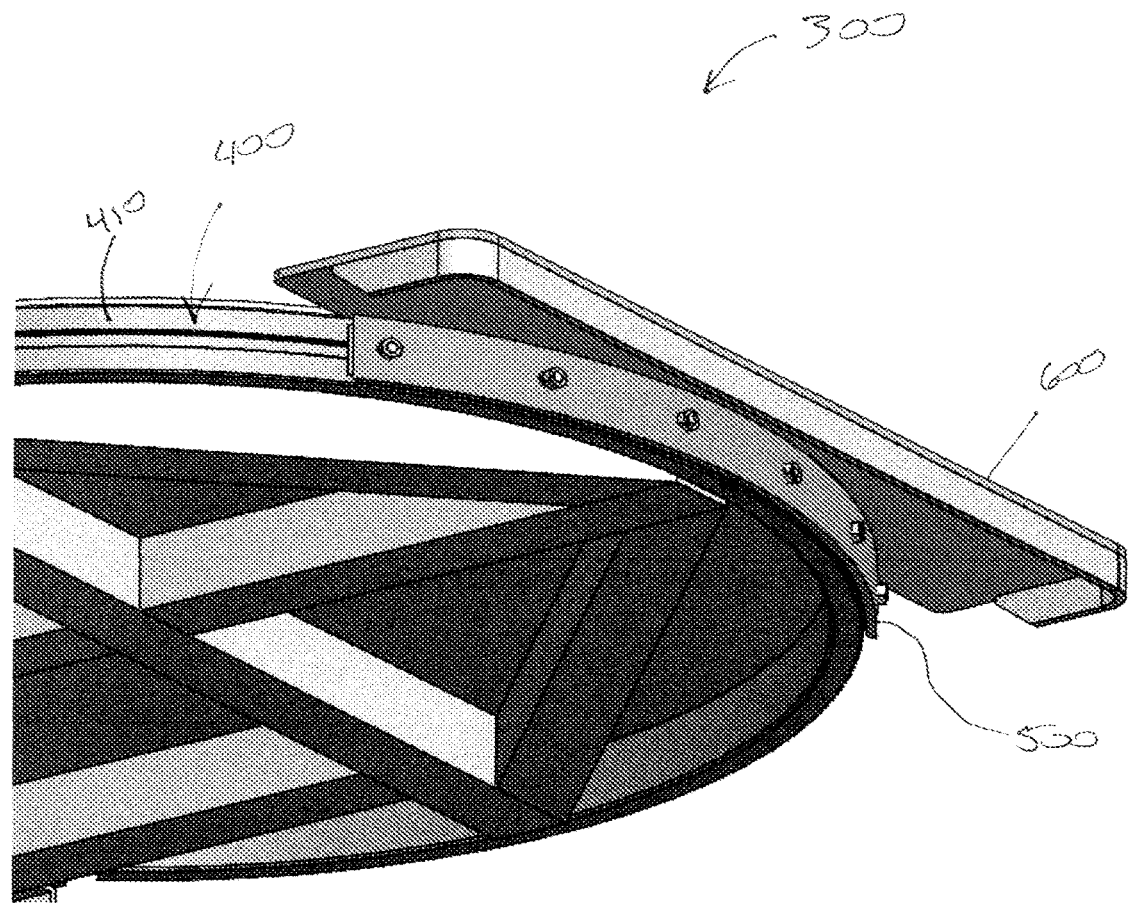
FIG. 6 is a perspective view of an embodiment of an orbit assembly connected to a trolley embodiment of the invention.

FIG. 5 shows an embodiment of a ramp 200. The ramp 200 is a straight rigid ramp with two railings 202, one on either side of the ramp 200. The railings are standard in the art and prevent a hand truck from falling off the side of the ramp by providing a small barrier and feedback to the user that the hand truck is getting too close to the side of the ramp. In use, the ramp 200 has an upper end 210 and a lower end 220. The upper end 210, in some embodiments, has a quick attachment feature, such as pegs, grooves, lips, or similar connectors, that allow the ramp 200 to be quickly attached to the orbit assembly 300. In other embodiments, the ramp 200 is permanently attached to the orbit assembly 300 with a hinge or similar connector that allows the ramp to have at least a limited range of vertical rotation around the upper end 210 so that it may be stowed at least somewhat level to the platform 100 and to be lowered to various levels depending on the ground surface being used for delivery.

Referring now to FIGS. 6-14, various embodiments of orbit assemblies 300 are shown and described. In general, the orbit assembly 300 includes a rail 400 and a trolley 500. The rail 400 is fixed to the platform 100 and is shaped to engage a rider 502, which is part of the trolley 500. The trolley 500, also shown in FIGS. 1-3, and shown as an isolated view in FIG. 7, includes a complementary circular shape 602 sized to compliment the circular portion 112 of the stage 102, and a straight edge 604 sized to receive the upper end 210 of the ramp 200. As indicated above, the ramp may be removably or permanently attached to the trolley 500 of the orbit assembly 300. The trolley 500 rides with one of the rider 502 or the rail 400. The trolley 500 further includes a mounting plate 606 that extends down from the circular shape 602, and is curved therewith, and may provide holes 608 to receive connectors of the various embodiments of the rider 502. The trolley 500 may further include a connection feature such as holes 610, for use in connecting the ramp 200 to the trolley 500.

Figure 7:
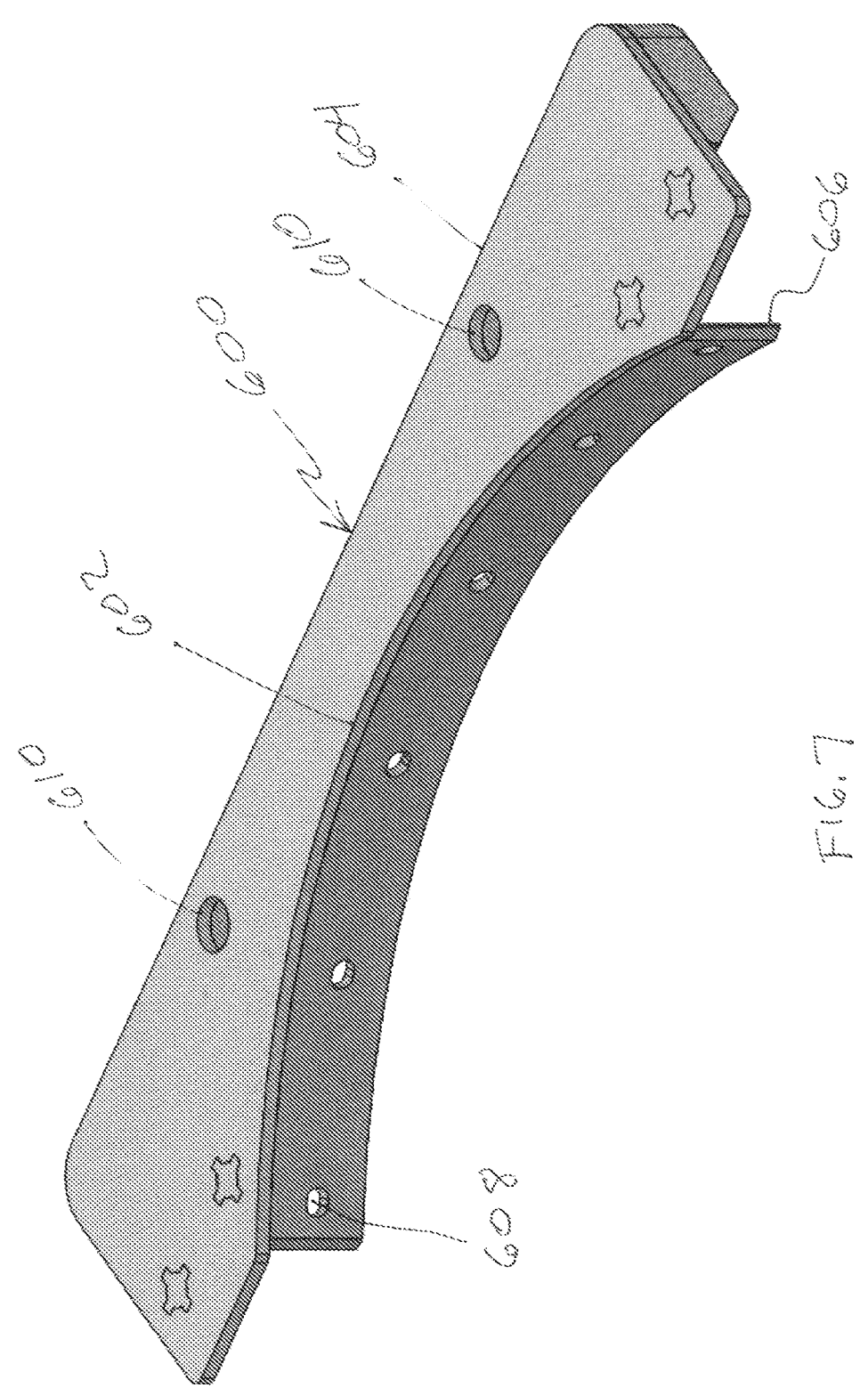
FIG. 7 is a perspective view of an embodiment of a trolley of the invention.
Figure 8:
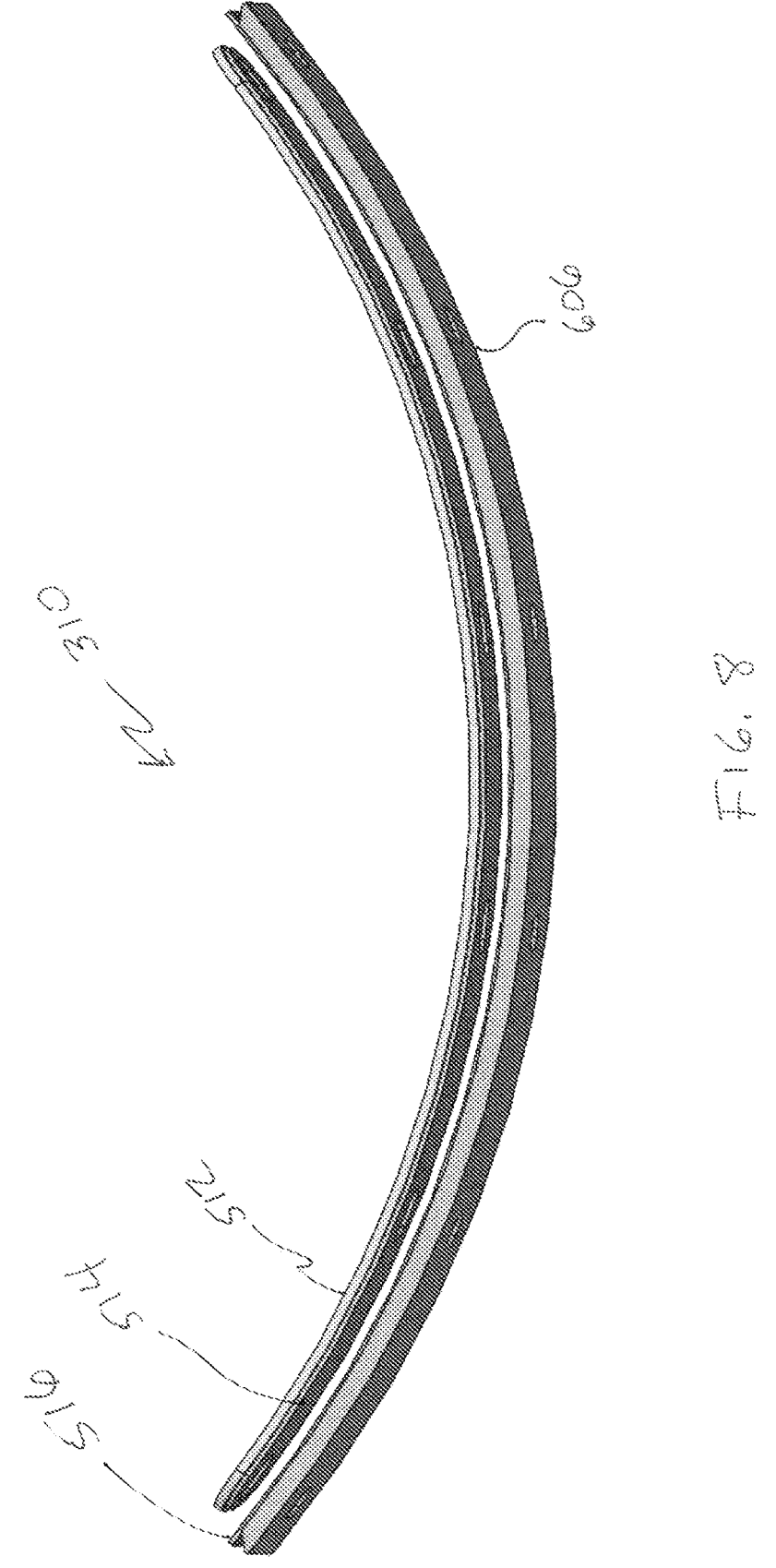
FIG. 8 is a perspective view of an embodiment of a rider of the invention.
Figure 9:
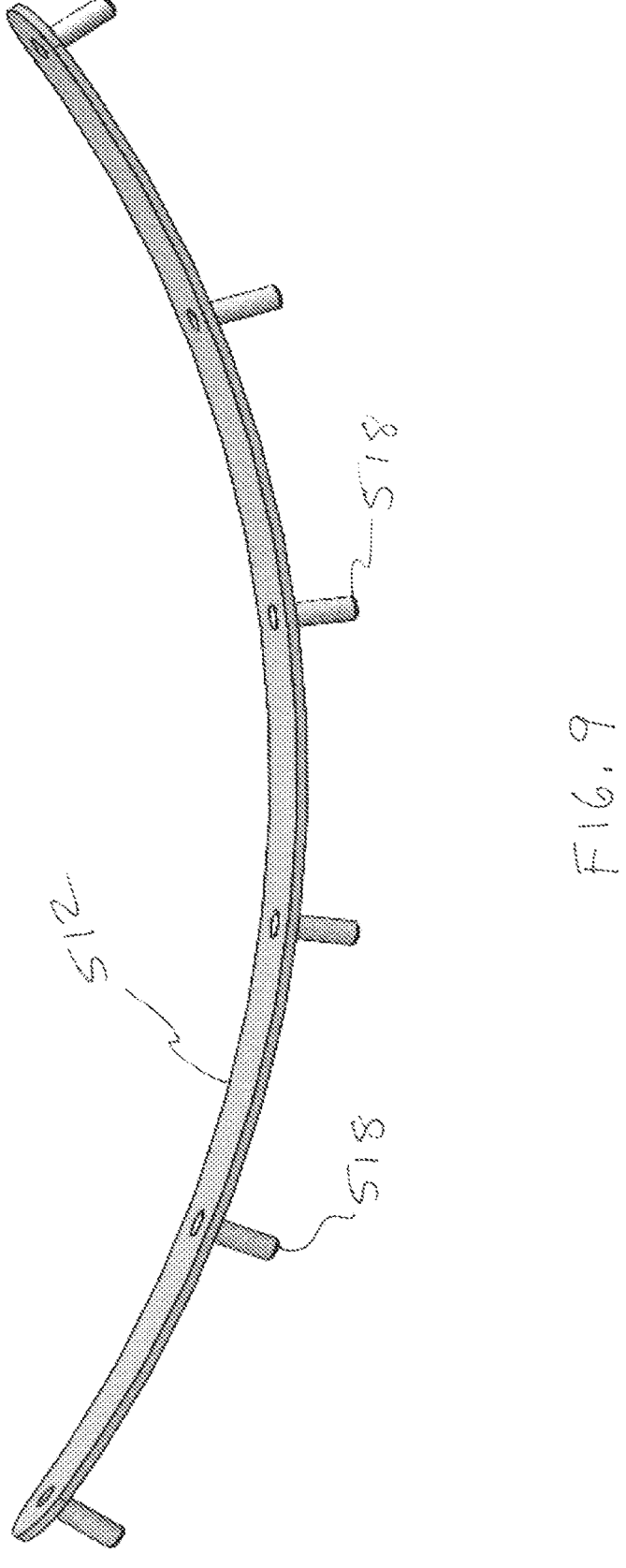
FIG. 9 is a perspective view of a component of the embodiment of the rider of FIG. 8.
Figure 10:
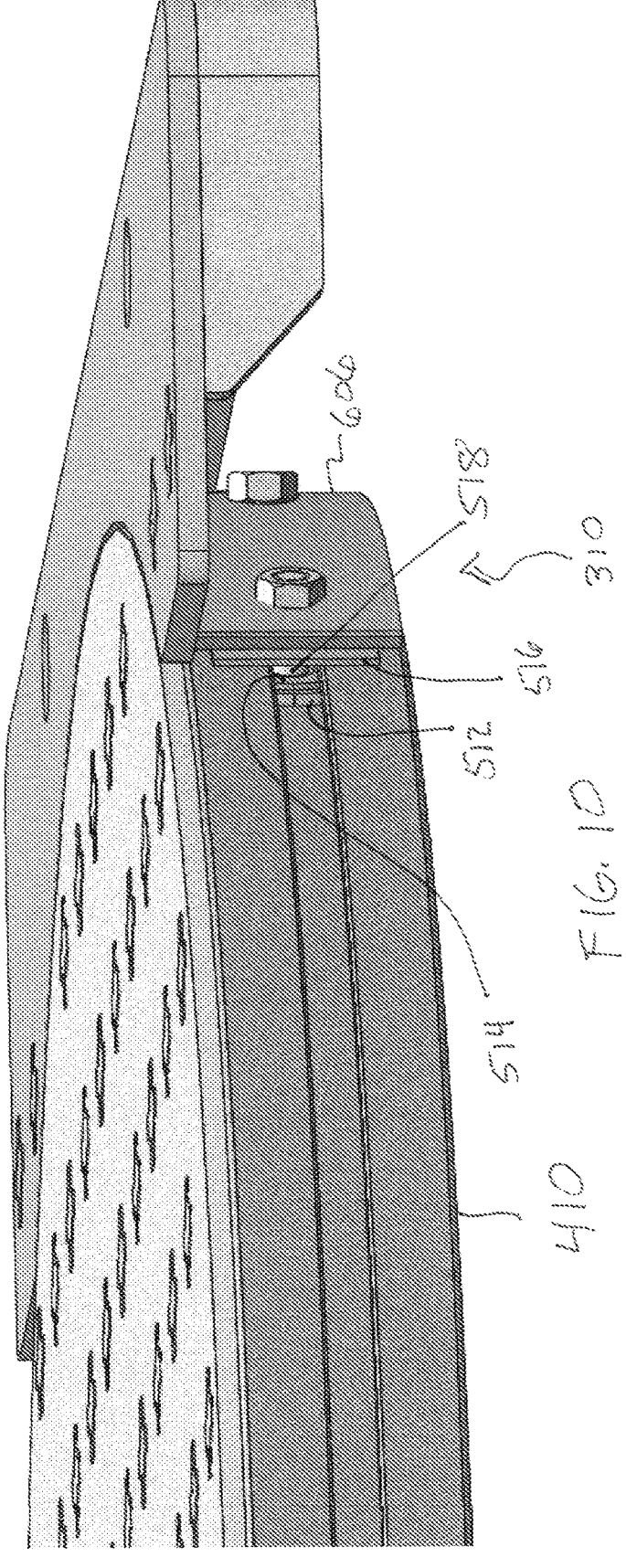
FIG. 10 is a perspective view of an embodiment of a trolley of the invention including the assembled rider of FIG. 8 connected to an embodiment of a rail of the invention.

One embodiment 310 of the orbit assembly is shown in FIGS. 6 and 8-10. Orbit assembly 310 is a vertical sliding assembly that includes a rail 410 and a rider 510. In this embodiment, the rail 410 is fixed to the platform 100 and the rider 510 is part of the trolley 500. The rail 410 (FIG. 6) is a rigid, open slot sized to receive the rider 510. The rail 410 may be formed of a strong rigid material such as steel or aluminum. The rider 510 (FIGS. 8-10), is a single or multiple-layer assembly and in at least one embodiment includes a strong support layer 512 and a low-friction polymer layer 514 that are laminated together and ride inside the rail 410. Another low-friction polymer layer 516 is layered against the mounting plate 606 of the trolley 500 and remains outside of the rail 410. As shown in FIGS. 9-10, the support later 512 includes a plurality of connectors 518, such as bolts or pins, that pass through the polymer layers 514 and 516 and mate with the holes 608 of the mounting plate 606 (FIG. 7). FIG. 10 shows the assembled orbit assembly.

One skilled in the art will realize that with any of the rail-rider configurations discussed herein, the terms "rail" and "rider" are merely conventions to describe one part riding inside or otherwise interacting with another part. The term "rail" connotes that "rider" movement is limited to a desired direction and that disengagement is prevented. Furthermore, movement is relative between the rail and the rider. The rail may be connected to (is part of) the trolley 500 and the rider may be connected to the platform 100, or vice versa, without departing from the spirit of the invention. Nothing else should be inferred by the use of the terms "rail" and "rider."

Figure 11:
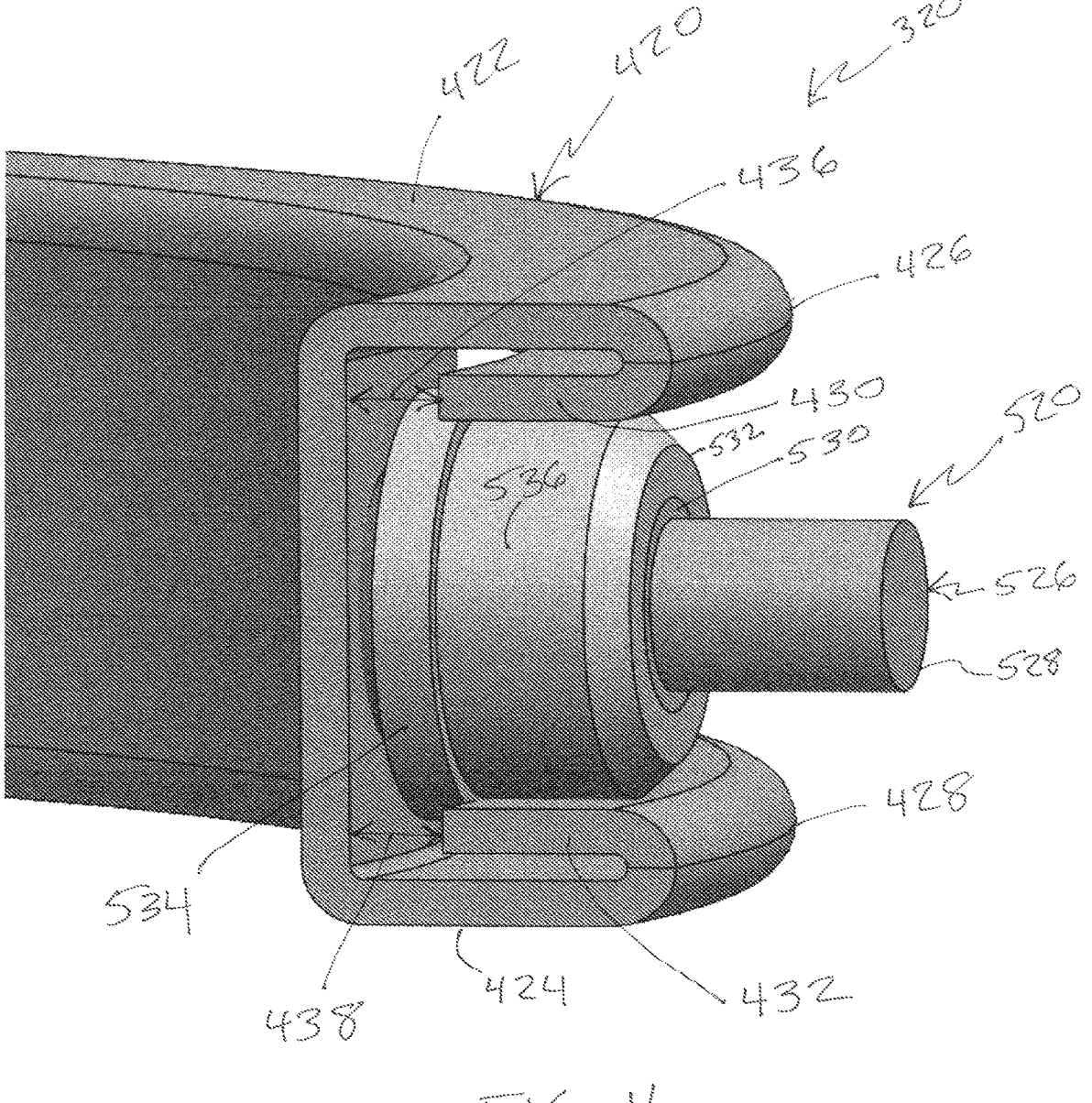
FIG. 11 is a perspective view of an embodiment of an orbit assembly of the invention.

Another embodiment 320 of the orbit assembly is shown in FIG. 11. The embodiment 320 includes a B-rail 420 and a rider 520. In this embodiment, the rail 420 is affixed to the platform 100 and the rider 520 is connected to or part of the trolley 500.

The rail 420 has an upper lip 422 and a lower lip 424 that include folds 426 and 428 respectively. The folds 426 and 428 create inner extensions 430 and 432, which terminate such that they are spaced apart from a wall 434 that connects the upper lip 422 and the lower lip 424. This spacing between the inner extensions 430, 432 and the wall 434 creates gaps 436 and 438.

The rider 520 is a plurality of wheel assemblies 526 that include posts 528 sized to be received by the holes 608 of the mounting plate 606 (FIG. 7). Each post 528 extends from a bearing 530 inside the wheel assembly 526. Surrounding the bearings 530 are wheels 532. The bearings 530 thus allow the wheels 532 to spin relative to the posts 528.

The wheels 532 are shaped to include a large diameter portion 534 and a small diameter portion 536. The small diameter portions 536 ride on the inner extension 432 of the lower lip 424 and are vertically supported thereby. The larger diameter portions 534 have a diameter larger than a vertical space between the upper and lower inner extensions 430 and 432, and a width that is slightly smaller than the gaps 436 and 438. The wheels 532 are therefore trapped within the rail 420 but allowed to roll to provide an orbiting capability to the trolley 500 and therefore the ramp 200 when the ramp 200 is attached to the trolley 500.

Figure 12:
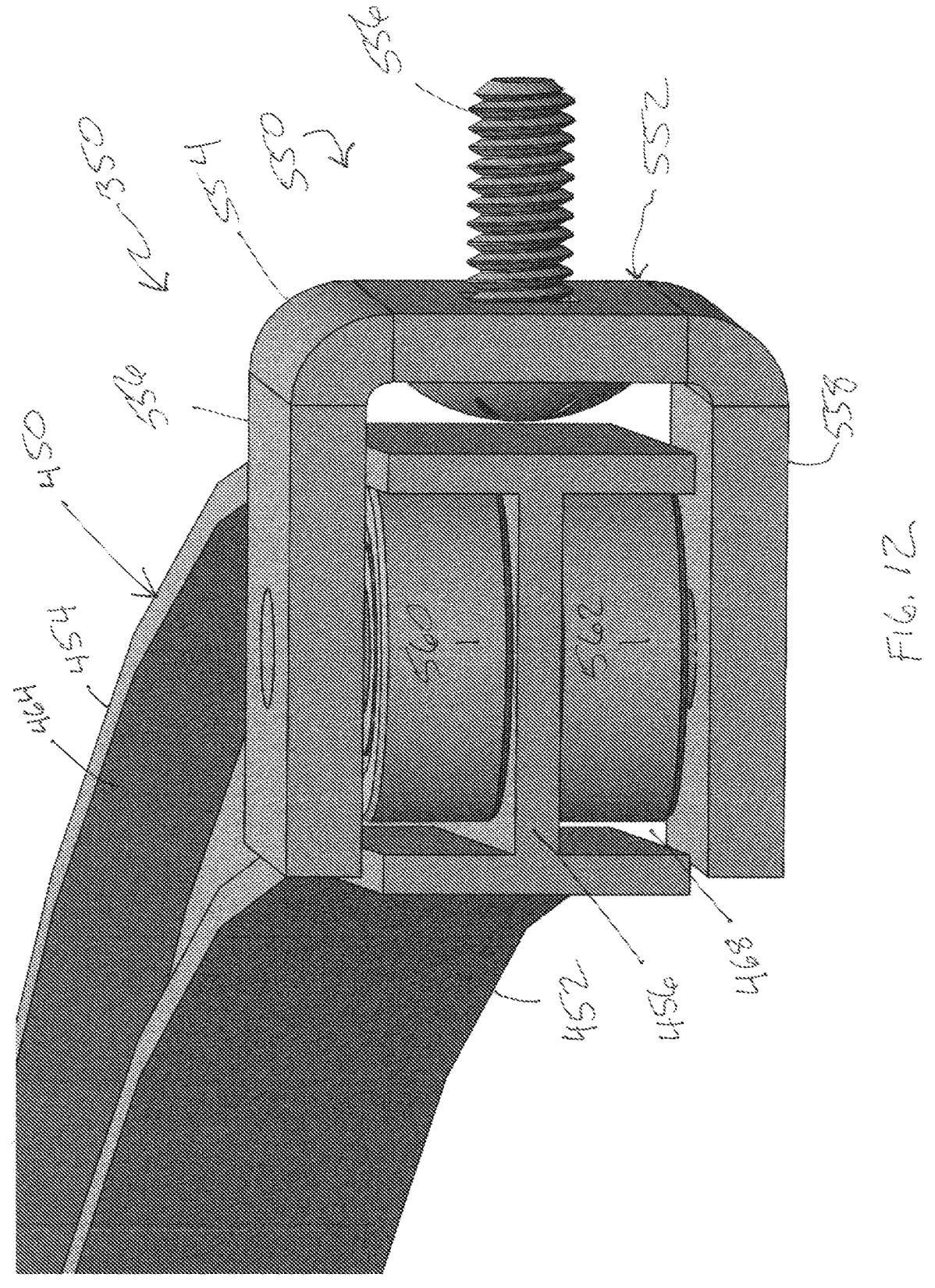
FIG. 12 is a perspective view of an embodiment of an orbit assembly of the invention.

Another embodiment 350 of the orbit assembly is shown in FIG. 12. The embodiment includes an I-beam rail 450 and a rider 550. The I-beam 450 is in the shape of a horizontally oriented I-beam and has an inside wall 452 and an outside wall 454 that are bifurcated by a cross member 456. The inside wall 452 is affixed to the platform 100.

The rider 550 is connected to or part of the trolley 500 and is a plurality of wheel assemblies 552. The wheel assemblies include a C-shaped frames 554 that are connected to the holes 608 of the mounting plate 606 (FIG. 7) with bolts 556 or other connectors. The frames 554 include upper and lower extensions 556 and 558 that act as mounts for upper and lower wheels 560 and 562 that ride in spaces 464 and 468 of the I-beam rail 450.

One feature of the I-beam rail 450 and rider 550 is that the horizontal orientation of the wheels 560 and 562 allows easy orbiting of the trolley 500 when the ramp 200 is lifted from the ground and moved laterally. However, when the ramp 200 is rested on the ground and a load is placed on the ramp, the horizontal bottom surface of the upper wheel 560 is pressed against the cross member 456, thereby increasing the friction on a non-rolling surface, thus preventing accidental lateral movement of the ramp 200.

Figure 13:
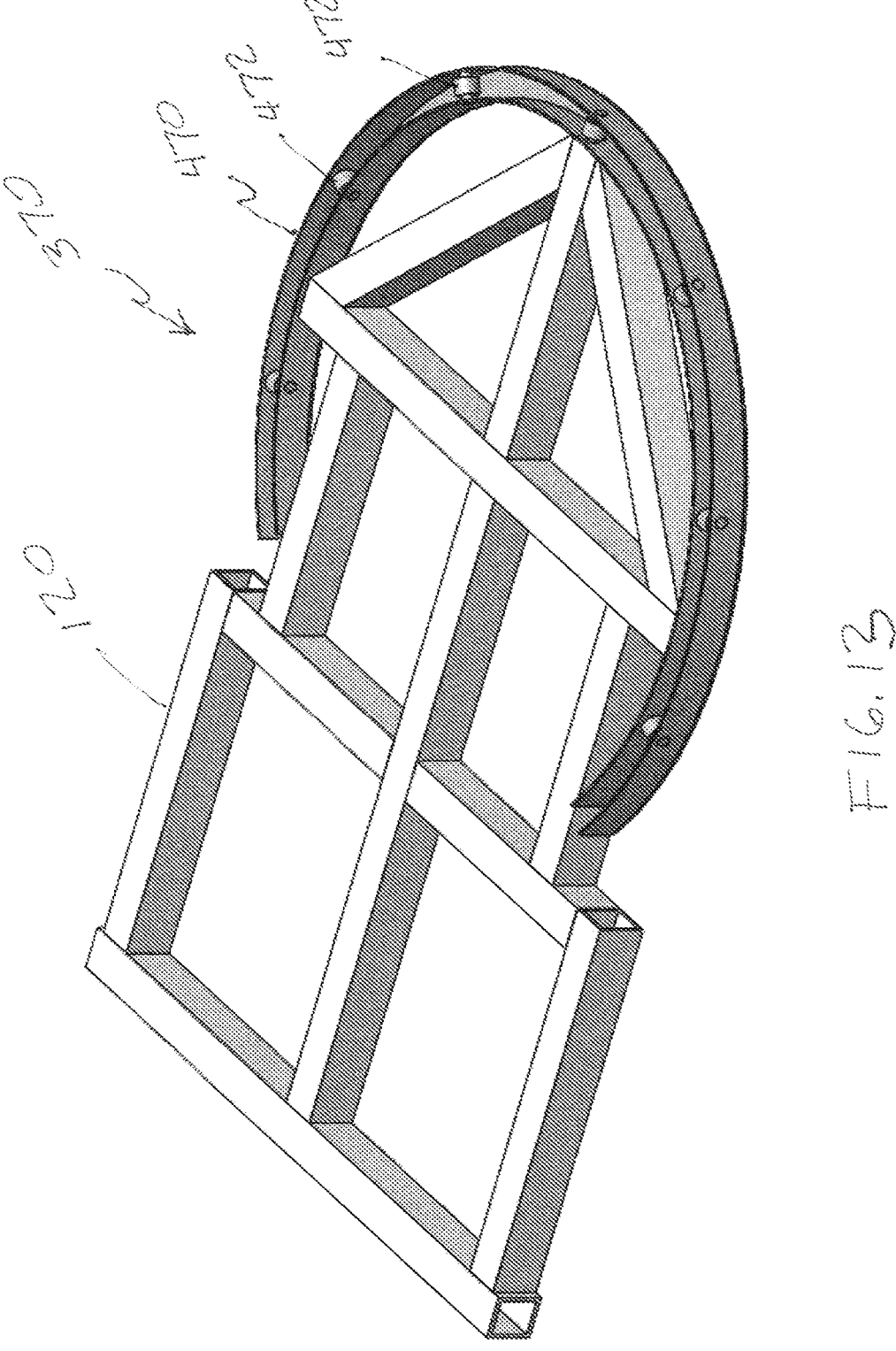
FIG. 13 is a perspective view of an embodiment of an orbit assembly of the invention.
Figure 14:
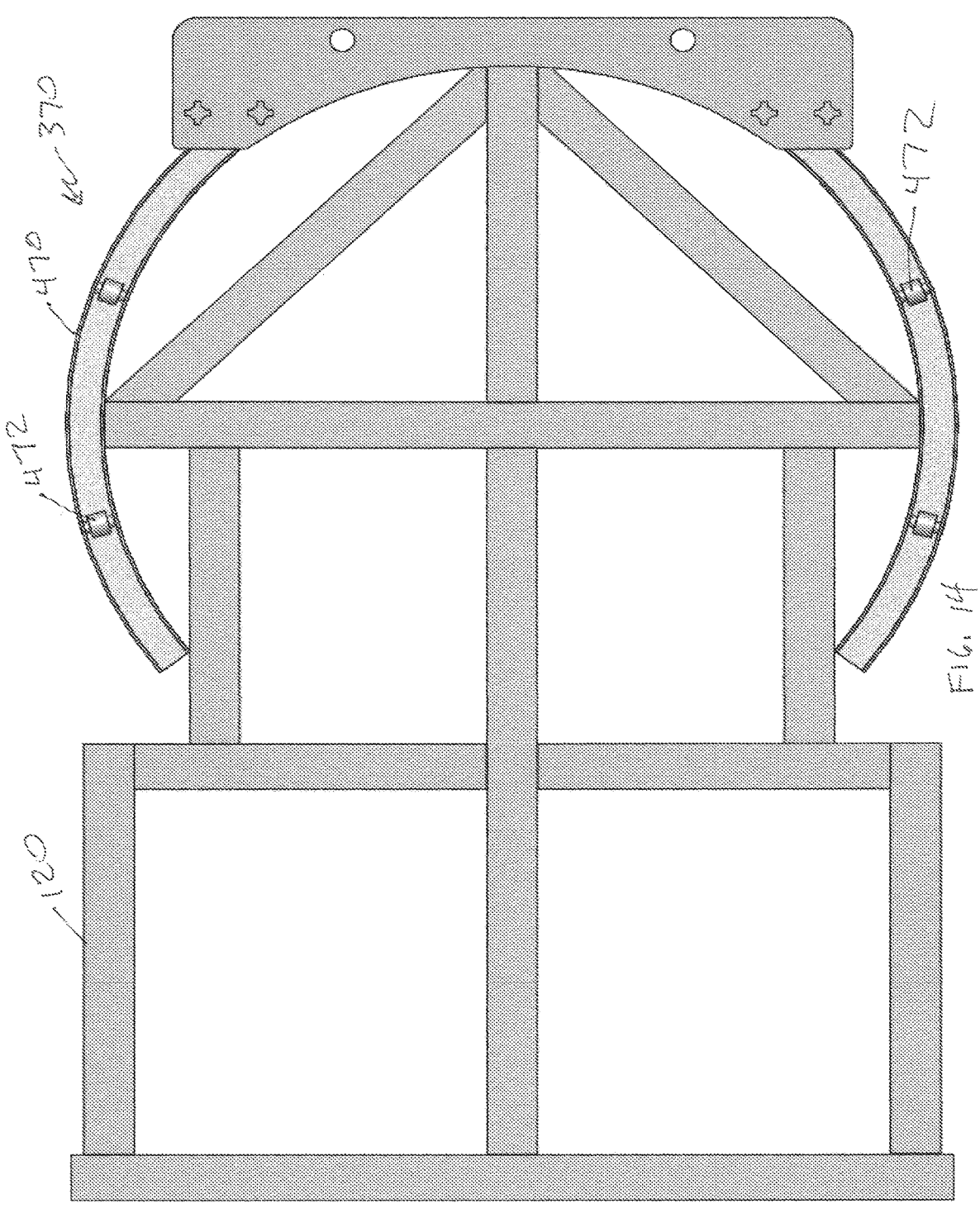
FIG. 14 is a plan view of an embodiment of an orbit assembly of the invention.

Yet another embodiment 370 of an orbit assembly is shown in FIGS. 13-14. The orbit assembly 370 includes a roller rail 470 and a rider 570. The roller rail 470 is U-shaped circular rail that includes a plurality of rollers 472 spaced apart inside the U-shaped rail 470. The roller rail 470 is connected to the platform frame 120.

The rider 570 that interacts with the rail 470 is a lip 572 extending down from the trolley 500 and is sized and shaped to ride in the rail 470 and is long enough to span at least two, or preferably three, rollers at once. In one embodiment, the lip 572 is long enough to span the curved edge of the trolley 500.

Figure 15:
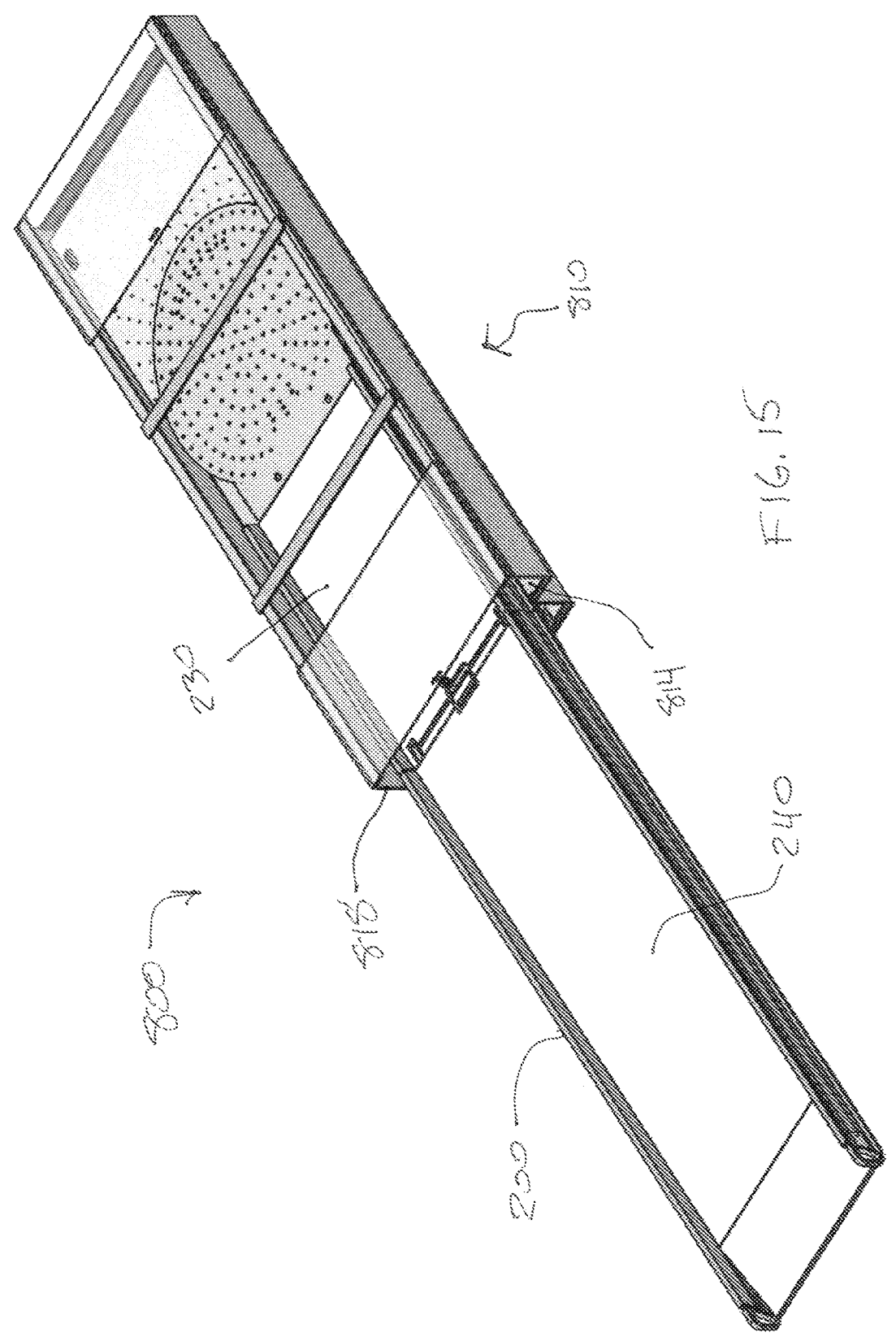
FIG. 15 is a perspective view of an embodiment of the drawer assembly of the invention.
Figure 16:
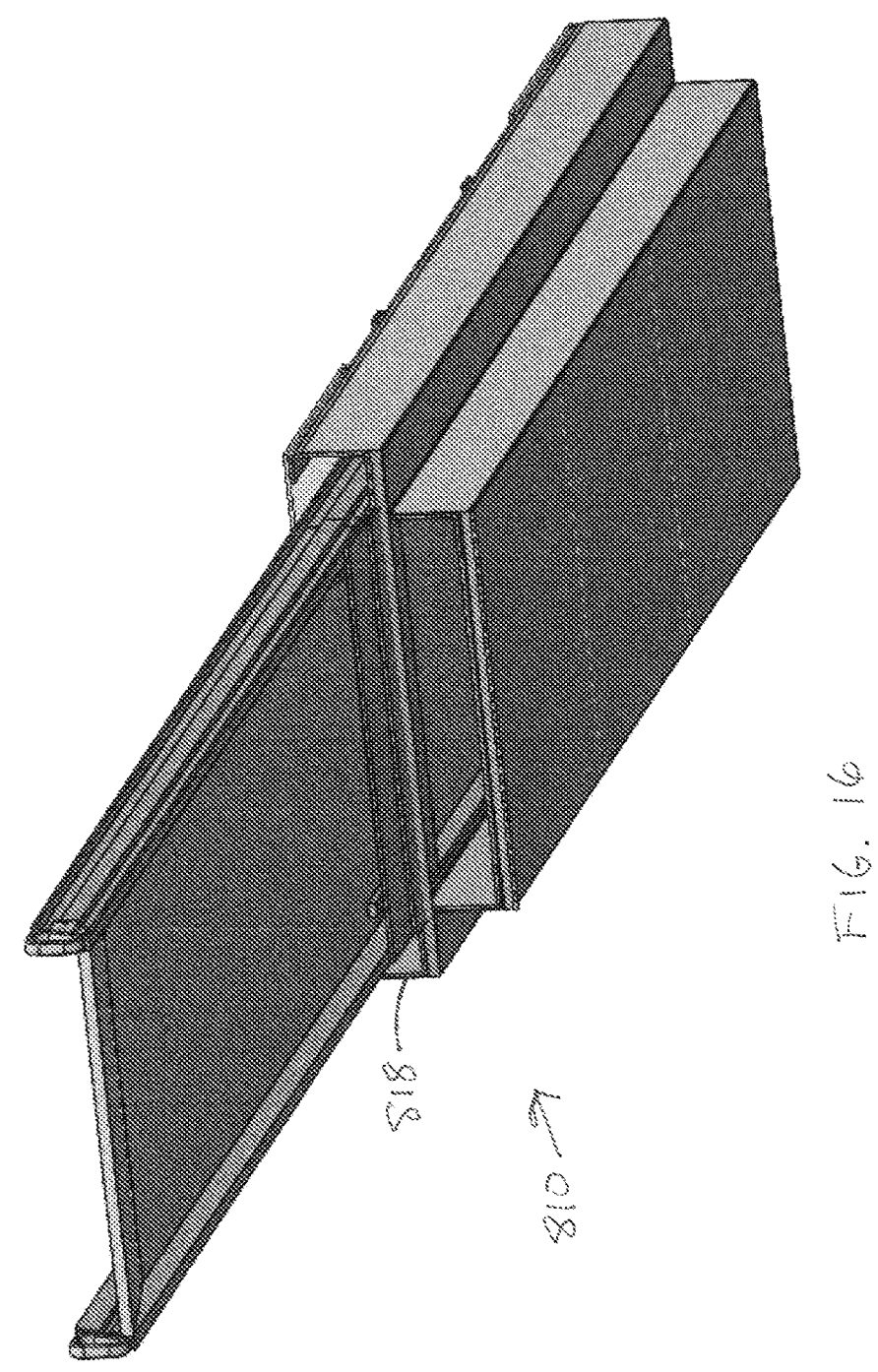
FIG. 16 is a perspective view of an embodiment of the drawer assembly of the invention.

FIG. 15-16 show an embodiment 810 of a drawer assembly 800. The drawer assembly is affixed to a bottom surface of a truck bed, directly below a loading door of the truck. In this embodiment, the drawer assembly 810 is a box-shaped assembly that includes rollers or slides on an inside bottom surface 814, that allows the entire ramp assembly 20 to be stored therein. A stop at the door end 818 of the drawer assembly 810 prevents the ramp assembly 20 from accidentally being pulled out of engagement with the drawer assembly 810.

Figure 17:
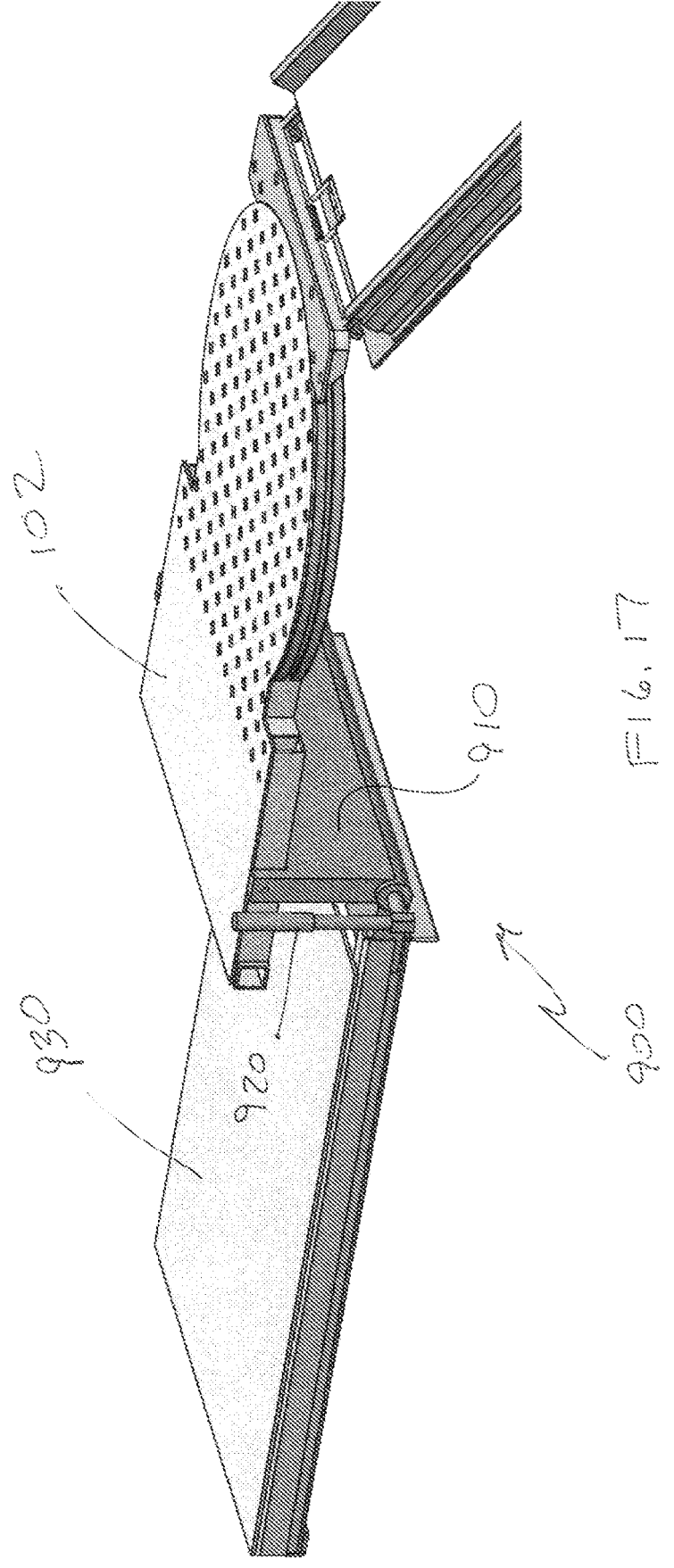
FIG. 17 is a perspective view of an embodiment of the lift assembly of the invention; and, FIG. 18 is a perspective view of an embodiment of the incline assembly of the invention.

Two potential issues associated with under-truck ramp storage are addressed by the various embodiments described herein. The first issue is ease of ramp storage and deployment. Ramps can be long and heavy. In order to effect easy, one-person operation, embodiment 810 shows a ramp 200 split into a top half 230 and a bottom half 240. Splitting the ramp into two halves not only divides the weight of the ramp into two, easy to lift components, but it also allows compact storage under the truck. FIGS. 15-17 show this embodiment of the ramp 200, along with a second shelf 850 of the drawer assembly 800. In use, the operator pushes the ramp assembly 20 into the top drawer until the ramp assembly 20 stops. A union 250 between the top half 230 and the bottom half 240 is then aligned with the door end 818 of the drawer assembly 800. The union 250 then allows the bottom half 240 of the ramp to then be separated from the top half 230 and stored in the second shelf 850 of the drawer assembly 800.

The second issue with under truck ramp storage addressed herein is aligning the stage 102 with the truck bed. Because the drawer assembly 800 is attached to the bottom of the truck, when the ramp assembly 20 is pulled out from the drawer assembly 800, the stage 102 will be lower than the truck bed creating a significant drop. In order to remove this drop, the stage 102 must be lifted or angled in order to create a smooth transition.

FIG. 17 shows a lift assembly 900 that includes a cam 910 and a lever 920 that is useable to raise the stage 102 from being level with a drawer slider 930 to a position that is level with the truck bed.

Figure 18:
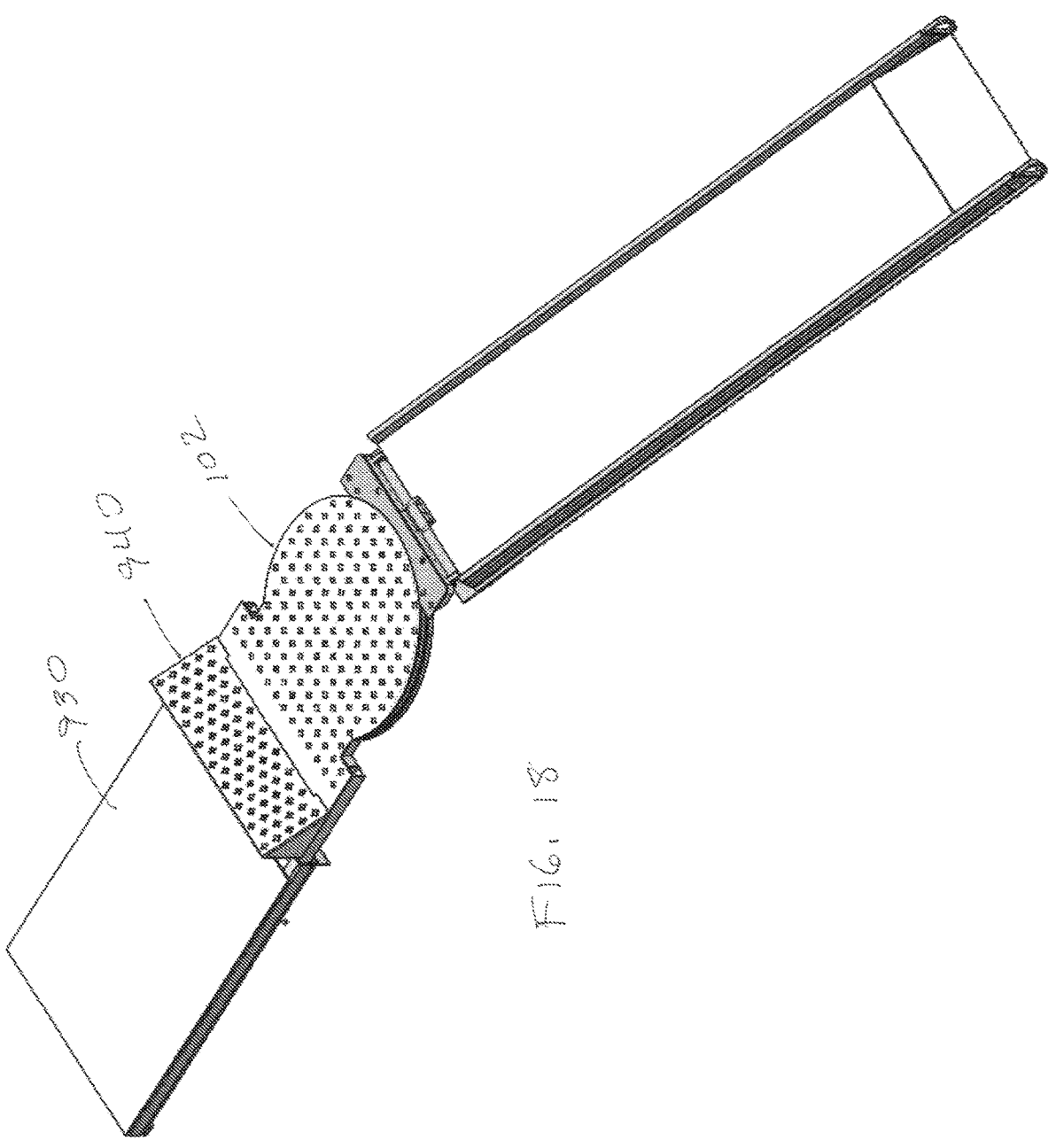

FIG. 18 shows a raisable incline 940 that creates a smooth transition from the truck bed to the platform 102 without having to lift the entire ramp assembly 20. The raisable incline 940 can be spring-loaded, lever-actuated, hydraulic, etc.

Although not shown in the Figures, another embodiment of a drawer assembly is contemplated. This embodiment includes a box similar to the box of embodiment 810 except that the length is long enough to accommodate the platform and the orbit assembly but not the ramp. An open slot in one of the sidewalls of the box is sized to allow the ramp to enter the slot. The opening of the slot may be flared to easily accept the ramp. In operation, when the ramp assembly is to be stowed, the operator lifts the lower end of the ramp and pushes the platform into the drawer assembly until it stops. The operator then orbits the ramp toward the truck, allowing the upper end of the ramp to enter the slot. The operator continues to orbit the ramp until the upper end of the ramp is under the truck. A bracket assembly receives the ramp and includes a lock to prevent accidental disengagement of the ramp assembly.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. An orbiting ramp assembly comprising:
a platform having a circular portion with a perimeter and including a stage and a stage frame supporting the stage;
a ramp;
a trolley having a circular edge that complements the perimeter of the platform and a straight edge configured to receive the ramp; and,
an orbit assembly connecting the trolley and the platform, the orbit assembly including a rail connected to the to the perimeter of the platform such that a downward force on the platform is not transferred to the orbit assembly, the rail and rider engaged such that the trolley can orbit at least partially around the platform while the platform remains stationary.

2. The orbiting ramp assembly of claim 1 wherein the ramp is fixed to the orbit assembly with a connector that allows the ramp to have at least a limited range of vertical rotation relative to the orbit assembly.

3. The orbiting ramp assembly of claim 1 wherein the rider comprises wheels that are locked into the rail and allowed to rotate within the rail.

4. The orbiting ramp assembly of claim 1 wherein one of the rail and the rider includes a plurality of wheel assemblies.

5. The orbiting ramp assembly of claim 1 wherein the rider comprises vertically oriented wheels.

6. An orbit assembly that connects a ramp to an elevated platform comprising:
a semi-circular rail and a semi-circular rider engaged with the rail such that the rider is able to translate along the semicircular rail;
wherein one of the rail and the rider is attachable to a perimeter of an elevated platform and the other of the rail and the rider is attachable to a trolley; and,
wherein when a ramp is attached to the trolley, the orbit assembly allows the ramp to be orbited at least partially around the elevated platform while the elevated platform remains stationary;
and wherein a downward force on the platform is not transferred to the orbit assembly.

7. The orbit assembly of claim 6 wherein the rail and the rider comprise a vertically oriented sliding assembly.

8. The orbit assembly of claim 6 wherein one of the rail and the rider includes a plurality of wheels.

9. The orbit assembly of claim 6 wherein the rail is a B-rail.

10. An orbiting ramp assembly for unloading loads from a truck having a bed, comprising:
a horizontal platform having a circular portion with a perimeter;
a ramp having a first end and a second end, opposite the first end;
a trolley connecting the first end of the ramp to the perimeter of the platform such that when the second end of the ramp is lifted, the ramp may be rotated horizontally relative to the platform;
wherein the trolley is supported by the perimeter.

11. The orbiting ramp assembly of claim 10 wherein the horizontal platform is level with the bed of the truck when in use.

12. The orbiting ramp assembly of claim 10 wherein the trolley includes a rider and the platform includes a rail attached to the perimeter, and wherein the rider and the rail are configured to slidingly mate to form an orbit assembly that allows the trolley to orbit partially around the perimeter of the platform.

13. The orbiting ramp assembly of claim 10 wherein the trolley isolates loads encountered by the platform from loads encountered by the ramp.

14. The orbiting ramp assembly of claim 12 wherein the rider comprises a vertically oriented slide and the rail comprises a corresponding slot.

15. The orbiting ramp assembly of claim 12 wherein the rider comprises wheel assemblies and the rail comprises a B-beam.

16. The orbiting ramp assembly of claim 12 wherein the rider comprises wheel assemblies and the rail comprises an I-beam.

17. The orbiting ramp assembly of claim 10 further comprising a drawer assembly attachable below the bed of the truck wherein the orbiting ramp assembly is stowable within the drawer assembly when not in use.

18. The orbiting ramp assembly of claim 17 wherein the drawer assembly comprises upper and lower shelves.

19. The orbiting ramp assembly of claim 18 further comprising a lift lever usable to raise the platform to a position level with the truck bed.

* * * * *